United States Patent
Baldwin

[15] 3,683,045
[45] Aug. 8, 1972

[54] PHENOTHIAZINE STABILIZED VINYL ESTER RESINS

[72] Inventor: Walton Leon Baldwin, 116 Mulberry, Lake Jackson, Tex. 77566

[22] Filed: Dec. 2, 1970

[21] Appl. No.: 94,582

[52] U.S. Cl.........260/837 R, 260/18 PF, 260/23 EP, 260/47 EP, 260/78.4 EP, 260/78.5 R, 260/836
[51] Int. Cl. .............................................C08g 45/04
[58] Field of Search................................260/836, 837

[56] References Cited

UNITED STATES PATENTS

| | | | |
|---|---|---|---|
| 3,301,743 | 1/1967 | Fekete | 260/837 |
| 3,377,406 | 4/1968 | Newey | 260/837 |
| 3,408,422 | 10/1968 | May | 260/837 |
| 3,420,914 | 1/1969 | May | 260/837 |
| 3,466,259 | 9/1969 | Jernigan | 260/837 |
| 3,109,035 | 10/1963 | Hornbaker | 260/92.8 |
| 2,998,405 | 8/1961 | Weldy | 260/45.8 |
| 3,014,888 | 12/1961 | Shimmin | 260/45.8 |
| 3,326,849 | 6/1967 | Kelly | 260/45.8 |
| 3,364,170 | 1/1968 | Savides | 260/45.8 |

*Primary Examiner*—Paul Lieberman
*Attorney*—Griswold & Burdick, H. L. Aamoth and Albin R. Lindstrom

[57] ABSTRACT

Phenothiazine has been found to be an effective gellation inhibitor for thermosettable vinyl ester resins without adversely affecting the catalyzed gel times and cure times as measured by the SPI exotherm test.

7 Claims, No Drawings

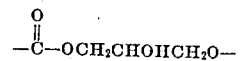

PHENOTHIAZINE STABILIZED VINYL ESTER RESINS

BACKGROUND OF THE INVENTION

Thermosettable resins generally have limited shelf lives, i.e. upon storage at ambient temperatures the resins undergo premature gellation which, of course, is undesirable. Generally, the tendency of a resin to gel increases as the storage temperature increases and is also dependent on the method of preparation, choice of reactants and on the kind and amount of monomer which is generally mixed with the resin.

Thermosettable vinyl ester resins have similar shelf life or storage stability problems. In the past, attempts with known stabilizing materials to prevent gellation have also resulted in an undesirable increase in the catalyzed gel times of the resins. In effect, those materials which were effective inhibitors were "too" effective since they adversely affected the curability of the resin. Typical of inhibitors taught by the art are certain hydroxyamines as proposed in U.S. Pat. No. 3,408,422.

SUMMARY OF THE INVENTION

This invention relates to the unexpected finding that phenothiazine, when added in small proportions, greatly increases the storage life of thermosettable vinyl ester resins without adversely affecting their catalyzed gel times. Effective proportions of phenothiazine range from about 0.001 to 1 percent by weight on the weight of resin.

DESCRIPTION OF THE INVENTION

To prevent gellation or to extend the shelf life of thermosettable vinyl ester resins a number of known classes of inhibitors were evaluated including various cresol, quinone, catechol, thio and metallic materials. While some of these were found to extend the shelf life they also were found to increase the catalyzed gel times almost in proportion to the increase in storage life. Since the curability of the vinyl ester resins was adversely affected, the inhibitors were of little practical utility.

After considerable further research effort, it was unexpectedly found that certain minor amounts of phenothiazine added to a vinyl ester resin greatly extended the resin's shelf life without adversely affecting the catalyzed gel time.

Phenothiazine is a known material as evidenced by its listing and description in the "Merck Index." U.S. Pat. No. 3,000,887 describes a method for purification of phenothiazine.

Effective proportions of phenothiazine range from about 0.001 to 1 weight percent based on the weight of resin, preferably about 0.001 to 0.05 weight percent. Since vinyl ester resins may be employed either with or without a polymerizable monomer and since the polymerizable monomer is reactive with the vinyl ester resin, the above proportions based on resin weight include the weight of monomer when said resin is employed as a monomer-resin mixture.

As defined herein, thermosettable vinyl ester resins broadly include resins prepared by reacting about equivalent proportions of an unsaturated monocarboxylic acid and a polyepoxide. The resulting resin is characterized as having terminal polymerizable groups joined to the organic residue of said polyepoxide by $$-\overset{O}{\underset{\|}{C}}-OCH_2CHOHCH_2O-$$

groups. A typical vinyl ester resin prepared by reaction of two moles of methacrylic acid with a diglycidyl ether of bisphenol A is shown by the following formula.

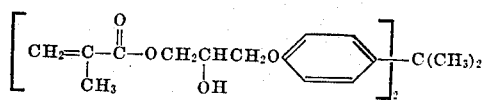

It can be seen from said formula that vinyl ester resins are chemically distinct from unsaturated polyesters which are prepared by condensing a glycol with a dibasic acid or anhydride.

The preparation of resins, herein defined as vinyl ester resins, and details as to reaction conditions, variations in proportions of reactants, choice of reactants, etc. are disclosed in U.S. Pat. Nos. 3,367,992; U.S. 3,066,122; U.S. 3,506,736; U.S. 3,179,623; U.S. 3,256,226; U.S. 3,301,743; and U.S. 3,337,406.

As shown in the above references a variety of polyepoxide resins may be used in the preparation of vinyl ester resins. Useful polyepoxides include polyglycidyl ethers of polyhydric phenols and polyhydric alcohols, epoxy novolac resins, epoxidized diolefins or fatty acids or drying oils provided the polyepoxide contains more than one oxirane group per molecule. The polyepoxides also include those wherein the molecular weight is increased by reaction with a difunctional compound such as a dicarboxylic acid.

Preferred polyepoxides are the polyglycidyl ethers of polyhydric phenols and polyhydric alcohols, the epoxy novolac resins and mixtures thereof wherein the epoxide equivalent weight may vary from about 150 up to about 6,000. Said polyepoxides are made by reacting at least about 2 moles of an epihalohydrin with 1 mole of a polyhydric phenol, polyhydric alcohol or novolac resin and a sufficient amount of a caustic alkali to combine with the halogen of the halohydrin. The products are characterized in having more than one epoxide group per molecule.

Unsaturated monocarboxylic acids useful in preparing vinyl ester resins include acrylic acid, methacrylic acid, halogenated acrylic or methacrylic acids, cinnamic acid, and the like mixtures thereof. Also included are the 2-hydroxyalkyl acrylate or methacrylate half esters of dicarboxylic acids as described in U.S. Pat. No. 3,367,992 wherein the hydroxyalkyl group preferably has from two to six carbon atoms. Typical half esters include the 2-hydroxyethyl acrylate half ester of maleic acid, the 2-hydroxypropyl methacrylate half ester of phthalic acid and the like. Either saturated or unsaturated dicarboxylic acid half esters may be used. Conveniently the half esters are prepared by reacting about one mole of said hydroxyalkyl acrylate or methacrylate with one mole of a dicarboxylic acid anhydride. Further details may be found in U.S. Pat. No. 3,367,992.

Various catalysts may be used in the preparation of vinyl ester resins. CAtalysts include tertiary amines such as tris(dimethylaminomethyl)phenol, onium catalysts, triphenyl stibine and triphenyl phosphine and the like. Usually hydroquinone or other like polymerization inhibitors are added to prevent polymerization during the preparation of the resin.

Also included within the definition of vinyl ester resins are those vinyl ester resins which have been further reacted with a dicarboxylic acid anhydride wherein said anhydride reacts with the hydroxyl group formed in the first step reaction of the monocarboxylic acid with the polyepoxide resin. Such resins are fully described in U.S. Pat. No. 3,446,259. The proportions of anhydride may vary up to about 1 to 1.2 moles or higher if necessary per mole of hydroxyl group.

As pointed out previously, vinyl ester resins are usually used in combination with monomers. The admixture of monomers is desirable in order to reduce the overall resin costs, but equally as important the final properties of the cured resin may be varied by the choice of the monomer and the amount used. Generally the unsaturated polymerizable resin comprises from about 30 to 80 weight percent of the mixture with the balance of about 70 to 20 weight percent comprising said monomer or mixtures of same.

A wide selection of copolymerizable monomers is available and include alkenyl aromatics, esters of acrylic or methacrylic acid, vinyl esters, vinyl acids, allyl and methallyl half esters and diesters of dicarboxylic acids, amide monomers and the like. Typical of said monomers are styrene, vinyl toluene, $\alpha$-methyl styrene, halogenated styrenes such as P-chlorostyrene, alkyl substituted aromatics such as t-butyl styrene, methyl methacrylate, ethyl acrylate, butyl acrylate, cyclohexyl methacrylate, $\alpha$-ethyl hexyl acrylate, octyl methacrylate, vinyl acetate, acrylonitrile, acrylic acid, methacrylic acid, acrylamide, diacetone acrylamide and the like. Divinyl monomers may also be employed.

Phenothiazine appears to be especially useful with certain vinyl ester resins or with certain resin/monomer mextures. Vinyl ester resins prepared from epoxy novolac resins or from diglycidyl ethers of long chain diols such as polypropylene glycol for some reason appear to have relatively shorter storage lives than other vinyl ester resins. Likewise, certain monomers such as vinyl toluene and monochlorostyrene appear to reduce the shelf life of vinyl ester resins dissolved therein. In both the above instances, phenothiazine is an effective gellation inhibitor and greatly extends the shelf life without adverse effect on curability.

The phenothiazine is usually added to the prepared resin either before or after admixture with a monomer but it may also be added to the reactants and be present during the preparation of the resin. It is preferred to add the phenothiazine to the prepared resin.

The following resins were prepared and tested for storage stability under accelerated conditions of storage at 55° C. All parts and percentages are by weight unless otherwise specified.

RESIN A

Vinyl ester resin A was prepared by reacting about 1 equivalent of methacrylic acid with 0.75 equivalent of an epoxy novolac having an epoxide equivalent weight (EEW) of 175–182 (D.E.N. 438) and 0.25 equivalent of a glycidyl polyether of bisphenol A having an EEW of 186–192 (D.E.R.). The above reactants were heated to 115° with catalyst and hydroquinone present until the carboxylic acid content reached about 1 percent. The reactants were cooled and then styrene (containing 50 ppm of t-butyl catechol) was added. The final resin contained

| styrene | 45% |
| methacrylic acid | 17.7% |
| D.E.N. 438 | 27.6% |
| D.E.R. 331 | 9.7% |
| Hydroquinone | 165 ppm |

Various amounts of phenothiazine were added to said resin and tested under accelerated storage conditions of 55° C. with the results recorded in the table below. A control, with no phenothiazine, was also run. One additional test was run where the phenothiazine was present during the preparation of the resin rather than being added afterwards to the prepared resin.

RESIN B

In a manner similar to resin A a vinyl ester resin of the following composition was prepared.

| styrene | 45% |
| methacrylic acid | 17.5% |
| D.E.N. 438 | 18.3% |
| D.E.R. 331 | 19.2% |
| hydroquinone | 165 ppm | resin C

Vinyl ester resin C was prepared by first reacting 1 equivalent of 2-hydroxypropyl acrylate with 1 equivalent of maleic anhydride at about 115° C. to form the half ester. The half ester was then reacted with 1 equivalent of D.E.R. 331 at 115° C. until the carboxylic acid content reached about 1.2 percent. The final resin contained approximately

| vinyl toluene | 30% |
| 2-hydroxypropyl acrylate | 21.8% |
| maleic anhydride | 16.4% |
| D.E.R. 331 | 31.8% |
| hydroquinone | 165 ppm |

RESIN D

Vinyl ester resin D was similar to resin C except that it contained 117 ppm of hydroquinone.

RESIN E

Bisphenol A was catalytically reacted with D.E.R. 331 at 150° C. under a nitrogen atmosphere for 1 hour to form a polyepoxide having an EEW of 535. After cooling to 110° C. additional D.E.R. 331 was added with methacrylic acid and reacted to a carboxyl content of about 2 –2.5 percent. Then maleic anhydride was added to the vinyl ester resin and reacted therewith. The final resin contained approximately

| bisphenol A | 7.7% |
| D.E.R. 331 | 25.1% |
| methacyrlic acid | 9.15% |
| D.E.R. 331 | 11.6% |
| maleic anhydride | 1.45% |
| styrene | 45% |

| Vinyl Ester | Resin | Phenothiazinc PPM | Storage Life (1) Days at 55°C. | Gel Time (2) Min. |
|---|---|---|---|---|
| | A | 0 | 6 | 10.3 |
| | | 200 | 34 | 8.6 |
| | | 150 | 28 (3) | 10.2 (3) |
| | | 100 | 21 | 9.7 |
| | | 110 (4) | 11 | 9.1 |
| | B | 0 | 5 | 8.4 |
| | | 100 | 27 | 9.5 |
| | C | 0 | 4 | 8.6 |
| | | 200 | 48 | 8.2 |
| | D | 0 | 4 | 5.6 |
| | | 200 | 63 | 4.2 |
| | E | 0 | 10 | 9.3 |
| | | 200 | 68+ | 7.6 |

(1) A + sign indicates tests still in progress.
(2) Catalyzed with 1% benzoyl peroxide at 180°F.
(3) Average of three tests.
(4) Phenothiazine added to reactants rather than to finished resin.

The above results demonstrate that phenothiazine is an effective gellation inhibitor and does not adversely affect curability.

Vinyl ester resins may be cured by exposure to ionizing radiation or by adding a free radical yielding catalyst such as benzoyl peroxide or the like and heating. Faster cures and cures even at room temperature may be obtained by additionally adding a polymerization promoter such as cobalt naphthenate, N,N-dimethyl-p-toluidine and the like. The resins are useful in a variety of applications and especially in reinforced plastics such as plastic pipe and the like. The stabilized vinyl ester resins of this invention greatly extend the commercial utility of said resins.

What is claimed is:

1. A thermosettable resin having improved storage life comprising a vinyl ester resin, prepared by reacting about equivalent amounts of an unsaturated monocarboxylic acid and a polyepoxide resin, and from about 0.001 to 1 percent by weight of said resin of phenothiazine.

2. The resin composition of claim 1 containing about 0.001 to 0.05 percent of phenothiazine.

3. The resin composition of claim 1 wherein said vinyl ester resin is further admixed with a copolymerizable monomer.

4. The composition of claim 1 wherein said vinyl ester resin is further reacted with a dicarboxylic acid anhydride.

5. The composition of claim 1 wherein said polyepoxide is an epoxy novolac.

6. The composition of claim 1 wherein said polyepoxide is a polyglycidyl ether of a polyhydric alcohol.

7. The composition of claim 3 wherein said monomer is vinyl toluene or monochlorostyrene.

* * * * *